June 7, 1966  R. N. THURSTON  3,254,529
STRAIN TRANSDUCERS INSENSITIVE TO TRANSVERSE AND SHEAR STRAINS
Filed March 29, 1963

INVENTOR
R. N. THURSTON
BY
ATTORNEY

3,254,529
STRAIN TRANSDUCERS INSENSITIVE TO TRANSVERSE AND SHEAR STRAINS

Robert N. Thurston, Whippany, N.J., assignor to Bell Telephone Laboratories, Incorporated, New York, N.Y., a corporation of New York
Filed Mar. 29, 1963, Ser. No. 268,864
15 Claims. (Cl. 73—88.5)

This invention relates to piezoresistive strain gages and more particularly to semiconductor strain gages which are capable of providing a strain measurement in a given longitudinal direction which is independent of the transverse and shear strains in the test body.

Piezoresistive strain gages have long been known in the art. They typically consist of metal foil in a prescribed geometrical configuration and operate according to the well known phenomenon of piezoresistivity. More recently, it has been found that semiconductor materials provide significantly greater piezoresistive response. Gage factors for semiconductor gages can be of the order of two orders of magnitude higher than those for the prior art metal gages.

Recently, there have been several techniques described for utilizing the anisotropies in the piezoresistive behavior of semiconductors to achieve novel and distinctly useful strain transducing functions. Certain of these are described and claimed in applications Serial No. 73,313 now Patent No. 3,186,217, Serial No. 80,672 filed January 4, 1961, Serial No. 96,463 now Patent No. 3,137,834, Serial No. 105,341 now Patent No. 3,137,833, Serial No. 105,355 now Patent No. 3,123,788 and application Serial No. 105,356 now Patent No. 3,150,341. Prior to these discoveries the design of strain transducers considered only the crystallographic direction of greatest sensitivity and ignored the remaining anisotropic effects.

The measurement of a longitudinal strain with a conventional prior art gage firmly bonded to the test body includes an electrical response to any transverse or shear strains present as they produce a piezoresistive effect in the longitudinal direction due to the transverse or shear piezoresistive coefficients. To resolve the portion of the piezoresistive response attributable solely to the longitudinal strain, additional measurements are necessary to determine the appropriate compensation for transverse and shear effects.

A strain gage construction has now been determined which is capable of directly sensing a longitudinal strain while being completely insensitive to transverse and shear strains. Such devices are based upon novel crystallographic orientations.

The invention and the following detailed analysis are perhaps more easily understood with the aid of the drawing in which.

Figure 1:
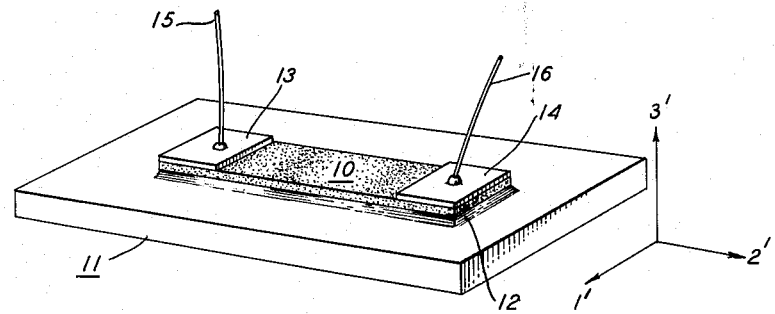
FIG. 1 is a perspective view of a semiconductor strain gage accompanied by a diagram relating the direction of electrical measurement to the crystallographic axes of the semiconductors.

FIG. 1 shows a typical strain gage comprising a semiconductor wafer 10 firmly bonded to a test body 11 by a conventional adhesive 12. Electrical contacts 13 and 14 and leads 15 and 16 are used to obtain a resistance measurement through the gage body according to standard techniques.

Utilizing the anisotropies which appear in the piezoresistive response of cubic semiconductors, certain critical crystal directions may be chosen to achieve the desired ends to which this invention is directed. As exemplary of such crystallographic orientations are the following:

$$\theta = \cos^{-1} \sqrt{-\frac{2(\pi_{12}s_{11} - \pi_{11}s_{12}) + (\pi_A s_{12} - \pi_{12}s_A)}{\pi_A s_{11} - \pi_{11}s_A}}$$

where $\theta$ is an angle of rotation about the [110] direction, and the $s$ and $\pi$ values are the compliance coefficients and the piezoresistive coefficients, respectively. This gage orientation gives zero transverse and shear response when the current measurement is in the [2'] direction.

$$\theta = \sin^{-1} \pm \sqrt{\frac{-b}{2a} \pm \sqrt{\left(\frac{b}{2a}\right)^2 - \frac{c}{a}}}$$

where $$a = -\pi_A(3s_{11} - 2s_A) \tag{2}$$
$$b = -(\pi_{12}s_A - \pi_A s_{12}) + \pi_A(3s_{11} - 2s_A)$$
$$c = \pi_{12}s_{44}$$

and again the $\pi$ and $s$ values are the piezoresistive and compliance coefficients.

$$\theta = \cos^{-1} \pm \sqrt{\frac{-b}{2a} \pm \sqrt{\left(\frac{b}{2a}\right)^2 - \frac{c}{a}}}$$

where $$a = \frac{3}{2}(\pi_A s_{12} + \pi_{12}s_A) + \pi_A s_A \tag{3}$$
$$b = -(\frac{3}{2}\pi_{12}s_A + \pi_A(\frac{3}{2}s_{12} + \frac{1}{2}s_{11} + s_A))$$
$$c = \pi_{12}(s_{11} - s_{12}) + \frac{1}{2}\pi_A s_{11}$$

and the $\pi$ and $s$ values are as in Equations 1 and 2.

Figure 2:
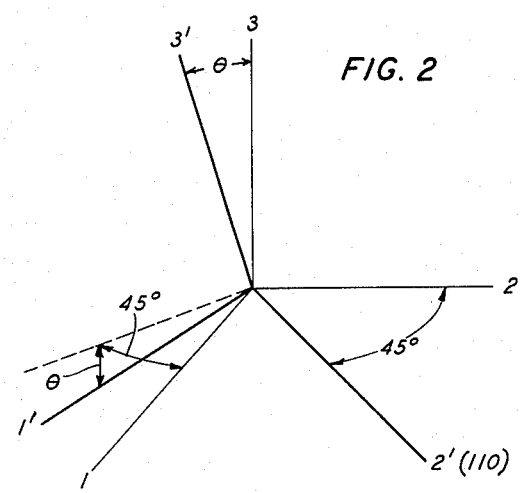
FIG. 2 is a diagram of the principal crystal directions in a cubic crystal structure and illustrates a procedure for determining the appropriate deviation from the standard to obtain the unexpected results of this invention.

These three formulas for $\theta$ are all referred to a common crystal axial alignment in which the [110] direction lies intermediate the 1 and 2 directions. This is shown in FIG. 2 and is conveniently considered by rotating the standard 1 and 2 directions by 45° to the 1', 2' positions. Now the angle $\theta$ is merely an angle of rotation about the 2' axis and is shown by 3' as a deviation from the 3 axis. The direction of current measurement for the configuration prescribed by Equation 1 is the 2' or [110] direction whereas for the orientations of Equations 2 and 3 the direction of current measurement is the 3' direction. In both cases the gage plane is the 1'-2' plane which, according to convention, can be expressed by merely specifying the 3' direction. The 3' direction is [001]−$\theta$, rotated about the [110] direction. Consequently the gage plane is defined as the (001)−$\theta$ plane where $\theta$ is a prescribed angle of rotation about the (110) axis.

Figure 3:
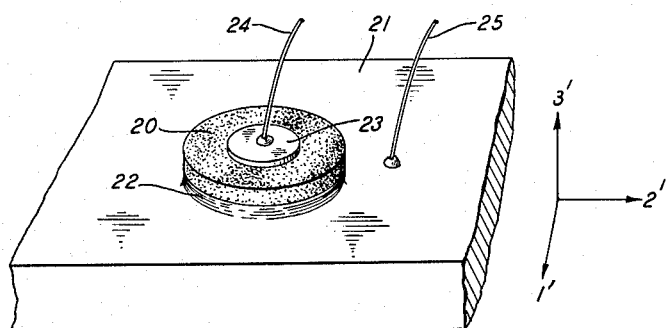
FIG. 3 is a perspective view of an alternative gage form which can also be constructed according to the teachings of this invention.

A device utilizing a perpendicular (3') direction of current flow is illustrated in FIG. 3. In the device of FIG. 3 the current is measured in the 3' direction as indicated which is normal to the plane of the gage. The semiconductor wafer 20 is bonded to the test body 21 by an adhesive 22. Contact 23 is alloyed to the top face of the wafer as shown and lead 24 is attached to the contact. In this case the test body 21 is a conductive body and is utilized as part of the current path. Accordingly, the adhesive 22 is a conductive adhesive such as a metal solder and the second electrode contact 25 is made to the test body 21. The crystal directions prescribing the gage plane and the direction of current measurement 3' are shown by the adjacent diagram. The relationship between the 1', 2' and 3' directions and the primary 1, 2 and 3 axes is the same as those shown by FIG. 2. The plane of the gage is the 1'-2' plane. Gage forms utilizing the 3 direction for the piezoresistive measurement are described and claimed in applications Serial Nos. 105,341 and 105,356 both filed April 25, 1961. In each case the plane of the gage is the 1'-2' plane.

Since this invention is concerned with cubic semiconductors the prescribed angle of deviation, expressed simply as $\theta$, actually has four values for a given choice of axes. The angles can be expressed as $\theta$, $-\theta$, $180°-\theta$, $\theta-180°$. In this discussion and in the appended claims the notation $\theta$ should be accorded this significance.

The appropriate values for the $\pi$ and $s$ coefficients will vary according to the cubic semiconductor chosen. Examples of the coefficients for some of the more common semiconductors are given in the following table.

TABLE I.—PIEZORESISTANCE AND COMPLIANCE COEFFICIENTS AT ROOM TEMPERATURE

[$10^{-12}$ cm.²/dyne]

| Material | Resistivity | $\pi_{11}$ | $\pi_{12}$ | $\pi_{44}$ | $\pi_D$ | $\pi_A$ | $s_{11}$ | $s_{12}$ | $s_{44}$ | 1/B | $s_A$ |
|---|---|---|---|---|---|---|---|---|---|---|---|
| n-Ge | 9.9 ohm-cm | -4.7 | -5.0 | -137.9 | +14.7 | +138.2 | | | | | |
| Ge | | | | | | | .979 | -.267 | 1.497 | 1.333 | +.497 |
| p-Ge | 1.1 ohm-cm | -3.7 | +3.2 | +96.7 | -2.7 | -103.6 | | | | | |
| n-Si | 11.7 ohm-cm | -102.2 | +53.4 | -13.6 | -4.6 | -142.0 | | | | | |
| Si | | | | | | | .768 | -.214 | 1.256 | 1.02 | +.354 |
| p-Si | 7.8 ohm-cm | +6.6 | -1.1 | +138.1 | -4.4 | -130.4 | | | | | |
| n-PbTe | 1-3×10¹⁸/cm.³ | +20 | +25 | -107 | -70 | +102 | | | | | |
| PbTe | | | | | | | .947 | -.073 | 7.63 | 2.40 | -2.79 |
| p-PbTe | 1-3×10¹⁸/cm.³ | +35 | +40 | +185 | -115 | -190 | | | | | |
| p-PbSe | 1-3×10¹⁸/cm.³ | +24 | +19 | +57 | -62 | -52 | | | | | |
| n-PbS | 1-3×10¹⁸/cm.³ | +11.6 | +6.6 | -11.2 | -24.7 | +16.2 | | | | | |
| PbS | | | | | | | 1.01 | -.231 | 4.0 | 1.645 | -0.76 |
| n-InSb | | -81.6 | -114.2 | +33.0 | +310.0 | -0.4 | | | | | |
| InSb | | | | | | | 2.42 | -.855 | 3.31 | 2.13 | +1.62 |
| p-InSb | 0.54 ohm-cm | -70 | -115 | -10 | +300 | +55 | | | | | |

$\pi_D \equiv -(\pi_{11}+2\pi_{12})$, $\pi_A \equiv \pi_{11}-\pi_{12}-\pi_{44}$, $1/B \equiv 3(s_{11}+2s_{12})$, $s_A \equiv s_{11}-s_{12}-\frac{1}{2}s_{44}$.

These values will vary depending on the resistivity and quality of the material but, given the proper values, which are obtainable by conventionally known measurements, the proper crystal orientation is easily calculated from Equations 1 to 3.

Using the data from Table I some suitable orientations are:

TABLE II

| Example | Material | Current Direction | $\theta$ |
|---|---|---|---|
| 1 | n-Ge | 2' | 53° |
| 2 | n-Si | 2' | 48° |
| 3 | p-Ge | 2' | 56° |
| 4 | p-Si | 2' | 57° |
| 5 | n-Ge | 3' | 68° |
| 6 | p-PbTe | 3' | 28° |
| 7 | n-Si | 3' | 37° |
| 8 | n-PbTe | 3' | 43° |

The piezoresistive coefficients associated with the prescribed current direction for the orientations given in Table II can be quite high. For instance, based upon the data of FIG. 1, for n-Ge according to Example 1, the value exceeds 100. Other typical values are: for n-type PbTe according to Example 8 the coefficient is 33; for n-Si according to Example 7 the value is 18. Since the data of Table I is subject to large variation depending upon the quality of the semiconductor material being measured, this invention will be most effective if the piezoresistance and compliance coefficients are determined specifically for the material of interest and the appropriate angles obtained from Equations 1 to 3.

Various other modifications and extensions of this invention will become apparent to those skilled in the art. All such variations and deviations which basically rely on the teachings through which this invention has advanced the art are properly considered within the spirit and scope of this invention.

What is claimed is:

1. A piezoresistive strain gage comprising a wafer of a cubic semiconductor, the plane of said wafer being perpendicular to [001]—$\theta$ where:

$$\theta = \cos^{-1}\sqrt{-\frac{2(\pi_{12}s_{11}-\pi_{11}s_{12})+(\pi_A s_{12}-\pi_{12}s_A)}{\pi_A s_{11}-\pi_{11}s_A}}$$

and where $\theta$ is an angle of rotation about the [110] direction, and the $s$ and $\pi$ values are the compliance coefficients and the piezoresistive coefficients respectively of the semiconductor and electrical contacts attached to said wafer such that strain responsive resistance variations of the wafer may be measured in the [110] direction of the wafer.

2. A piezoresistive strain gage comprising a wafer of a cubic semiconductor, the plane of said wafer being perpendicular to [001]—$\theta$ where:

$$\theta = \sin^{-1} \pm \sqrt{\frac{-b}{2a} \pm \sqrt{\left(\frac{b}{2a}\right)^2 - \frac{c}{a}}}$$

and where $\theta$ is an angle of rotation about the [110] direction, $a = -\pi_A(3s_{11}-2s_A)$
$b = (\pi_{12}s_A - \pi_A s_{12}) + \pi_A(3s_{11}-2s_A)$
$c = \pi_{12}s_{44}$ and the $\pi$ and $s$ values are the piezoresistive and compliance coefficients respectively of the semiconductor and electrical contacts attached to said wafer such that strain responsive resistance variations of the wafer may be measured in the [110] direction of the wafer.

3. A piezoresistive strain gage comprising a wafer of a cubic semiconductor, the plane of said wafer being perpendicular to [001]—$\theta$ where:

$$\theta = \cos^{-1} \pm \sqrt{\frac{-b}{2a} \pm \sqrt{\left(\frac{b}{2a}\right)^2 - \frac{c}{a}}}$$

and where $\theta$ is an angle of rotation about the [110] axis $a = \frac{3}{2}(\pi_A s_{12} + \pi_{12}s_A) + \pi_A s_A$
$b = -(\frac{5}{3}\pi_{12}s_A + \pi_A(\frac{3}{2}s_{12} + \frac{1}{2}s_{11} + s_A))$
$c = \pi_{12}(s_{11}-s_{12}) + \frac{1}{2}\pi_A s_{11}$ and the $\pi$ and $s$ values are the piezoresistive and compliance coefficients respectively of the semiconductor and electrical contacts attached to said wafer such that strain responsive resistance variations of the wafer may be measured in the [110] direction of the wafer.

4. The gage of claim 1 wherein the semiconductor is n-Ge.

5. The gage of claim 4 wherein the angle $\theta$ is approximately 53°.

6. The gage of claim 1 wherein the semiconductor is p-Ge.

7. The gage of claim 6 wherein the angle $\theta$ is approximately 56°.

8. The gage of claim 1 wherein the semiconductor is n-silicon.

9. The gage of claim 8 wherein the angle $\theta$ is approximately 48°.

10. The gage of claim 1 wherein the semiconductor is p-silicon.

11. The gage of claim 10 wherein the angle $\theta$ is approximately 57°.

12. The gage of claim 2 wherein the semiconductor is n-germanium.

13. The gage of claim 12 wherein the angle $\theta$ is approximately 68°.

14. The gage of claim 3 wherein the semiconductor is n-type PbTe.

15. The gage of claim 14 wherein the angle $\theta$ is approximately 43°.

References Cited by the Examiner

Mason et al.: "Use of Piezoresistive Materials in the Measurement of Displacement, Force, and Torque," Journal of the Acoustical Society of America, volume 29, Number 10, October 1957, pp. 1096–1101.

Pfann, W. G. et al.: "Semiconductor Stress Transducers Utilizing the Transverse and Shear Piezoresistive Effects"; Journal of Applied Physics; vol. 32, No. 10, October 1961, pages 2008 to 2019 (pages 2011 and 2012 relied on).

RICHARD C. QUEISSER, *Primary Examiner.*

DAVID SCHONBERG, *Examiner.*

ERNEST F. KARLSEN, CHARLES A. RUEHL,
*Assistant Examiners.*